Aug. 25, 1959   J. M. FENNER   2,900,784
CORD AND ARTICLE CONTAINING THE SAME
Filed Jan. 15, 1958
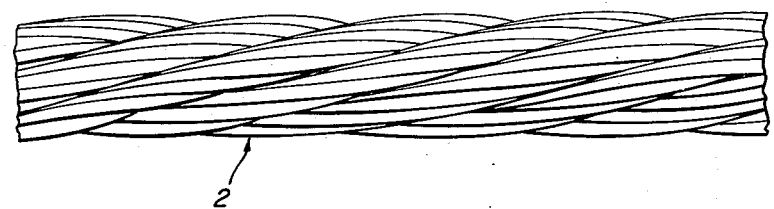
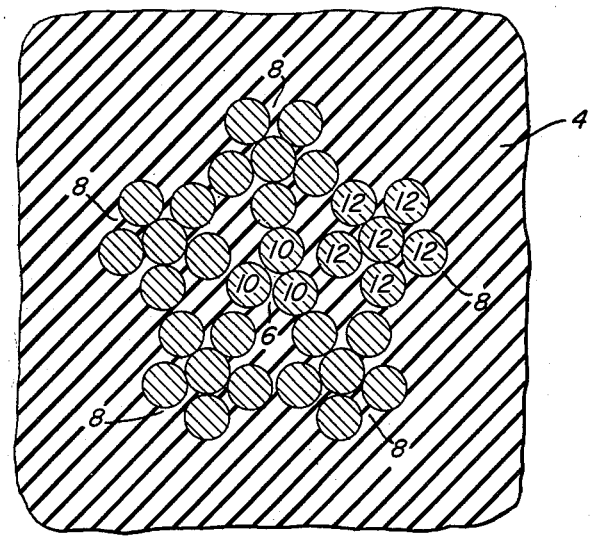
INVENTOR
JAMES M. FENNER
By: *Donald G. Walton*
Attorney

# 2,900,784

CORD AND ARTICLE CONTAINING THE SAME

James M. Fenner, Chagrin Falls, Ohio, assignor to United States Steel Corporation, a corporation of New Jersey Application January 15, 1958, Serial No. 709,079

6 Claims. (Cl. 57—148)

This invention relates to a cord and to an article containing the same and more particularly to a steel cord which is embedded in a rubber article such as an automobile tire or belting. It is common practice to use cord, particularly in large truck tires. For best performance there should be a good bond between the rubber and the cord and the fatigue resistance should be great. Various types of cords have been tried for this purpose but none have been satisfactory from all viewpoints. If the fatigue resistance is good the bond may be poor or the cost of the cord may be excessive. In my copending application Serial No. 585,662, filed May 18, 1956, a cord is disclosed which has very satisfactory characteristics and is cheaper to manufacture than most cords. However, manufacturers of tires and belting are particularly interested in obtaining cords having suitable characteristics at less cost.

It is therefore an object of my invention to provide a cord which is less expensive to manufacture than any cord of which I have knowledge.

Another object is to provide such a cord which when embedded in a rubber article will have high fatigue resistance, good bond and minimum weight.

These and other objects will be more apparent after referring to the following specification and attached drawings, in which:

Figure 1 is a longitudinal view of the cord of my invention; and

Figure 2 is an enlarged cross-sectional view showing the cord embedded in a rubber article.

Referring more particularly to the drawings, reference numeral 2 indicates the cord of my invention which is embedded in a rubber article 4. It will be seen that the rubber has flown readily into the interstices of the cord. The cord consists of a center core 6 and five strands 8 surrounding the center core. The core 6 preferably consists of three wires 10 stranded or twisted together. Each strand 8 consists of six wires 12 which are twisted or bunched together as in my above mentioned copending application. As there described each wire is on the outside of the strand over part of its length. The strands 8 are helically laid around the core 6 with the lay of the wires in the strand being opposite to the lay of the strand of the core. For example, if the wires in the core and strand are right hand lay the strands around the core will be left hand lay. The lay of both the wires and strands is preferably long; for example, the lay of the strands should be at least fifteen times the diameter of the strand making up the cord. The wires are made of metal, preferably steel, and are preferably all of the same diameter. This cord is less expensive to manufacture than a cord of the same strength made according to my copending application because a fewer number of wires of larger diameter are used. In this construction it is also easy for the rubber to get into the interstices of the cord, thus giving a better bond and increased fatigue resistance.

While one embodiment of my invention has been shown and described it will be apparent that other adaptations and modifications may be made without departing from the scope of the following claims.

I claim:

1. A cord comprising a center core formed of three wires twisted together, and five 6-wire strands laid helically around the core, each strand consisting of six wires twisted together with each wire being on the outside of the strand over part of its length.

2. A cord according to claim 1 in which the lay of the wires in the strand is opposite to the lay of the strands in the cord.

3. A cord comprising a center core formed of three wires twisted together, and five 6-wire strands laid helically around the core, each strand consisting of six wires twisted together with each wire being on the outside of the strand over part of its length, all wires being substantially of the same diameter.

4. An article comprising a metallic cord embedded in rubber with the rubber extending into the interstices of said cord, said cord including a center core formed of three wires twisted together, and five 6-wire strands laid helically around the core, each strand consisting of six wires twisted together with each wire being on the outside of the strand over part of its length.

5. An article according to claim 4 in which the lay of the wires in the strand is opposite to the lay of the strands in the cord.

6. An article comprising a metallic cord embedded in rubber with the rubber extending into the interstices of said cord, said cord including a center core formed of three wires twisted together, and five 6-wire strands laid helically around the core, each strand consisting of six wires twisted together with each wire being on the outside of the strand over part of its length, all wires being substantially of the same diameter.

References Cited in the file of this patent

UNITED STATES PATENTS

| | | |
|---|---|---|
| 1,727,971 | Ford | Sept. 10, 1929 |
| 2,277,145 | Pierce | Mar. 24, 1942 |
| 2,372,142 | Warren, Jr. | Mar. 20, 1945 |
| 2,401,291 | Smith | May 28, 1946 |

FOREIGN PATENTS

| | | |
|---|---|---|
| 125,971 | Australia | Oct. 16, 1944 |
| 652,585 | Great Britain | Apr. 25, 1951 |